United States Patent [19]

Novak et al.

[11] Patent Number: 5,549,321

[45] Date of Patent: Aug. 27, 1996

[54] TILT CONTROL APPARATUS FOR AN AUTOMOTIVE SUSPENSION

[75] Inventors: Stanley J. Novak, Dearborn; Kenneth J. Boyd, Taylor, both of Mich.

[73] Assignee: Ford Motor Company, Dearborn, Mich.

[21] Appl. No.: 488,701

[22] Filed: Jun. 9, 1995

[51] Int. Cl.⁶ .................. B60G 21/055; B60G 21/073
[52] U.S. Cl. .................. 280/689; 267/190; 267/191
[58] Field of Search ........................ 280/689, 772, 280/723, 688; 267/190, 191, 188, 187, 273

[56] References Cited

U.S. PATENT DOCUMENTS

| | | | |
|---|---|---|---|
| 2,087,351 | 7/1937 | McIntyre | 267/187 |
| 3,490,786 | 1/1970 | Ravenel | 267/188 |
| 3,575,441 | 4/1971 | Arning et al. | 267/189 |
| 4,206,935 | 6/1980 | Sheppard et al. | 280/723 |
| 4,488,736 | 12/1984 | Aubry et al. | 280/689 |
| 4,784,406 | 11/1988 | Stinson | 280/689 |
| 4,892,329 | 1/1990 | Kozaki et al. | 280/689 |
| 5,161,818 | 11/1992 | Kopieczek | 280/723 |
| 5,161,822 | 11/1992 | Lund | 280/689 |
| 5,186,486 | 2/1993 | Hynds et al. | 280/689 |

FOREIGN PATENT DOCUMENTS

| | | | |
|---|---|---|---|
| 0382633 | 8/1990 | European Pat. Off. | 267/188 |
| 2536019 | 5/1984 | France | 267/191 |
| 2-24213 | 1/1990 | Japan | 280/689 |

*Primary Examiner*—Kevin Hurley
*Assistant Examiner*—Peter C. English
*Attorney, Agent, or Firm*—Gregory P. Brown

[57] ABSTRACT

A tilt control apparatus (16) interconnected between the chassis (12) and the suspension (14) includes a tilt damper (30) and a tilt spring (32) for controlling the tilt of the chassis relative to the suspension. A torque member (16) is utilized to transfer torsional reactions proportionate chassis tilt rate and angles. The torque member (16) has an effective stiffness substantially greater than that of the tilt spring (32).

16 Claims, 2 Drawing Sheets

TILT CONTROL APPARATUS FOR AN AUTOMOTIVE SUSPENSION

BACKGROUND OF THE INVENTION

1. Field of the Invention

This invention relates generally to suspensions systems for motor vehicles. More particularly, the present invention provides a tilt control apparatus capable of providing damping for tilting motions of the chassis relative to the suspension.

2. Disclosure Information

It is well known in the motor vehicle suspension art to use stablizer bars to increase tilt stiffness of the vehicle. The amount of tilt stiffness required in a particular suspension is generally a function of the design of the suspension coupled with its intended use. Typically, the suspension is designed to provide a predetermined degree of tilt stiffness and tilt damping from the primary suspension springs and dampers (shock absorbers and struts). However, some vehicle applications required additional tilt control. For example, some vehicles carry a payload that raises the center of gravity a considerable distance from the tilt axis of the vehicle. This significantly increases the moment arm acting on the vehicle tilt axis, thereby causing the vehicle chassis and payload to tilt relative to the suspension. Similarly, some vehicles undergo high speed cornering, creating high lateral acceleration which significantly increases the moment acting on the vehicle causing the vehicle chassis to tilt relative to the suspension.

In operation, the suspension is unable to deflect responsive to minor disturbances in the road surface due to resistance presented by the stablizer bar. These disturbances therefore transfer into the chassis of the vehicle. Unfortunately, this may have a deleterious effect on the customer's perception of the ride quality of the vehicle. Objectionable noises may be heard in the passenger compartment of the vehicle. These noises become increasingly noticeable with increasingly stiff stabilizer bars. Similarly, these minor disturbances may be perceived by the customer as objectionable jarring vibrations. It is difficult to achieve optimal damping for both tilting motion and bouncing motion of the body using traditional suspension designs.

It would be desirable to have a tilt control apparatus capable of providing additional tilt damping and stiffness for resisting very large tilt moments without imparting undesirable noises and jarring vibrations on the vehicle chassis.

SUMMARY OF THE INVENTION

The present invention provides a unique tilt spring and tilt damper for use in a suspension system of a motor vehicle. The tilt control apparatus reduces vehicle tilt while minimizing the transmission of noise and vibration to the chassis of the motor vehicle, thereby improving customer satisfaction.

In the presently preferred embodiment, the tilt control apparatus includes a torque member transversely oriented relative to a longitudinal axis of the motor vehicle having first and second ends. A first crank arm rigidly connects to the first end of the torque transfer member and a second crank arm rigidly connects to the second end of the torque member. The tilt control apparatus also includes a link member having a lower link end pivotally connected to the first crank arm opposite the torque member and an upper link end interconnecting the torque member between the chassis and the suspension system.

There is also a tilt damper having a lower damper end pivotally connected to the second crank arm opposite the torque member and an upper damper end interconnecting the torque transfer member between the chassis and the suspension. A tilt spring interconnects the torque transfer member between the chassis and the suspension such that the torque transfer member transfers a torsional reaction proportionate to a chassis tilt angle and rate. The tilt spring has an effective stiffness substantially less than that of the torque member.

An advantage of this tilt control apparatus is to provide a suspension system in which the tilting motions of the chassis relative to the suspension are opposed by a separate tilt damper in addition to a resilient tilt spring to thereby reduce vibrations and noises imparted into the chassis during operation of the vehicle suspension. The separate tilt damper decouples the damping for tilt motion from the damping provided for bounce suspension movements.

Other objects, features and advantages of the present invention will become apparent to those skilled in the art from the drawings, detailed description and claims which follow. dr

DETAILED DESCRIPTION OF THE PREFERRED EMBODIMENTS

Figure 1:
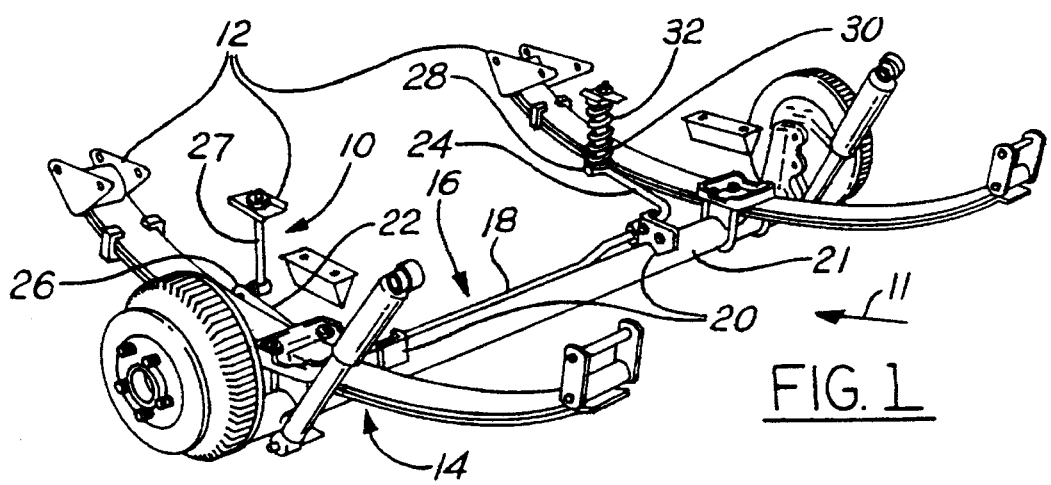
FIG. 1 is a perspective view of a portion of a motor vehicle suspension having a tilt control apparatus in accordance with the present invention.
Figure 3:
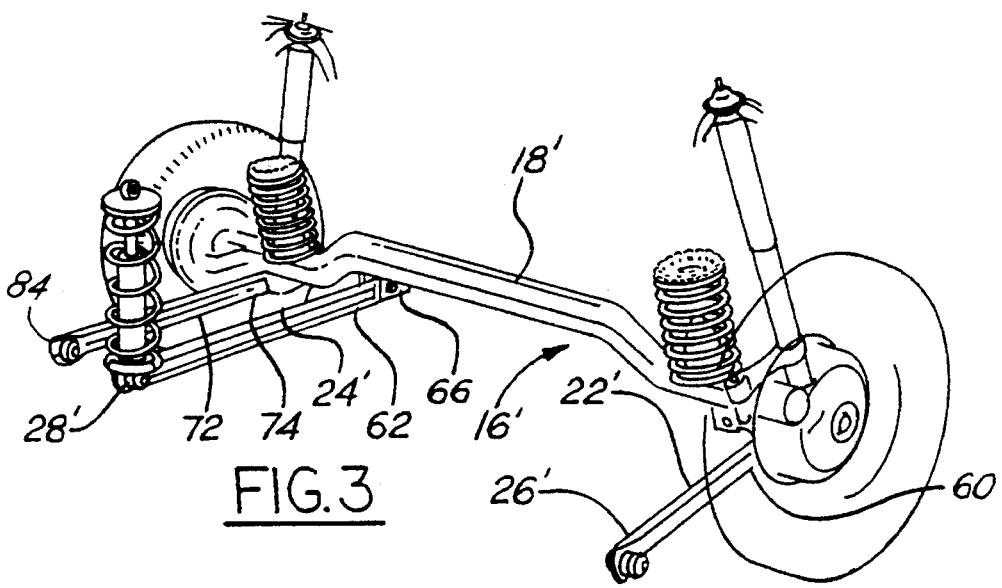
FIG. 3 is a perspective view of a motor vehicle suspension having an alternative embodiment of a tilt control apparatus in accordance with the present invention.

Referring now to FIG. 1, a tilt control apparatus 10 on a motor vehicle is shown. The motor vehicle generally includes a chassis 12 supported on a suspension system 14. For the purposes of this description, the chassis 12 includes either a unit body or a frame on body construction. The suspension may be either a live axle suspension as shown, or any other suspension system utilizing present stabilizer bar technology, including independent suspension systems. The longitudinal axis of the motor vehicle is indicated by an arrow 11.

A torque member 16 includes a central portion 18 transversely mounted by bushing blocks 20 to an axle member 21 in the suspension 14 at the front or rear of the motor vehicle. The bushing blocks 20 include an aperture (not shown) for rotatably supporting the torque member 16 on the axle member 21. First and second crank arms 22, 24 are integrally formed as forward projecting arms of the torque member 16. The forward end 26 of the first crank arm 22 is connected to the chassis by a link member 27 in a well-known manner. The forward end 28 of the second crank arm 24 is connected to the chassis 12 by a tilt damper 30 and a tilt spring 32. It is appreciated that the torque member 16 borrows its design from that of a conventional stabilizer bar; however, as is described below, the stiffness of the torque member 16 is considerably higher than normal°

Figure 2:
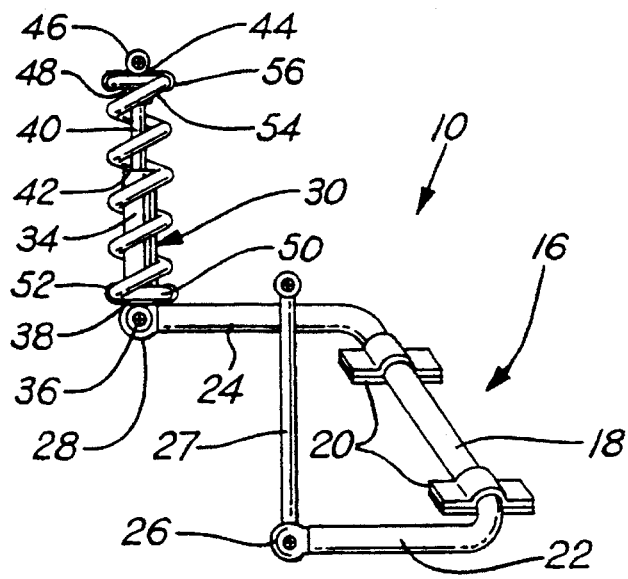
FIG. 2 is a perspective view of the tilt control apparatus shown in FIG. 1 according to the present invention.

Referring now to FIG. 2, a detailed view of the tilt control apparatus 10 is shown. The tilt damper 30 includes a cylindrical body 34 having a pivotable lower attachment element 36 at its lower damper end 38. The cylindrical body 34 of the tilt damper 30 receives a reciprocable rod 40 projecting from an upper end wall 42 of the body 34. The rod 40 passes through an aperture (not shown) in the upper end wall 42 of the body 34.

At its innermost end, the rod 40 includes a rod stop (not shown) which limits the extension of the rod 40 out of the body 34. Preferably, an elastomeric bump stop (not shown) is mounted on an inner surface of the upper end wall 42. At an upper damper end 44, the rod 40 includes a pivotable upper attachment element 46. The rod 40 also includes an upper elastomeric element 48. In general, the tilt damper 30 may be constructed in a manner similar to the construction of a primary suspension shock absorber. The primary difference occurring in the valving of the damper. In the preferred embodiment, the valve parameters in the tilt damper 30 are configured to provide equivalent damping for both compression and extension of the tilt damper 30.

The tilt spring 32 is of the coil type and is coaxially disposed about the tilt damper 30. The tilt spring 32 includes a lower spring end 50 securely connected to the lower damper end 38 by a clamp 52. The tilt spring 32 also includes an upper spring end 54 which is securely connected to the upper damper end 44 by a clamp 56. The lower and upper clamps 52, 56 ensure the tilt spring 32 and tilt damper 30 compress and extend together during operation.

The spring rate of the tilt spring 32 combines with the tilt stiffness of the suspension to determine the desired tilt rate for the suspension 14. This required the torque member 16 to have a torsional stiffness considerably higher than the effective stiffness of the tilt spring 32. Otherwise, the torque member 16 deforms rather than transferring the reaction to the tilt spring 32 and tilt damper 30. It has been observed that a stiffness differential of at least ten times will provide sufficient torque transfer. Stiffness ratios considerably less than this reduces the effectiveness of the tilt damper 30.

The free length of the tilt spring 32 is such that when the tilt control apparatus is installed in the vehicle, the tilt spring 32 is unloaded when the body is not tilted relative to the suspension. It is appreciated that other types of springs may be substituted for the coil type described herein for the tilt spring 32.

Referring now to FIGS. 3–7, an alternative embodiment of the tilt control apparatus is shown. Where like components are common between this embodiment and that described above, like reference numerals will be used. In this embodiment, the axle assembly 21 also serves as the central portion 18' of the torque member 16'.

Figure 4:
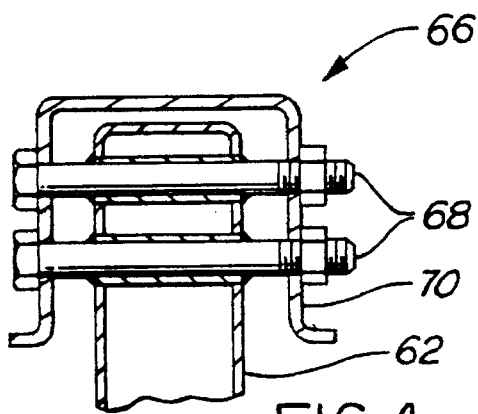
FIG. 4 is a sectional view taken along line 4—4 of FIG. 5 of the rigid connection between a first crank arm and the torque member according to the present invention.
Figure 5:
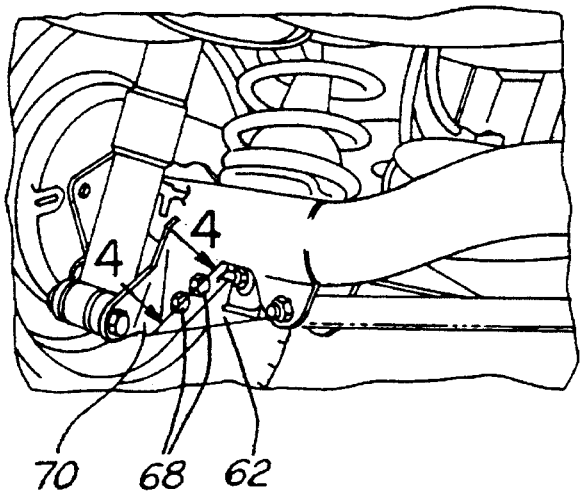
FIG. 5 is a perspective view of the rigid connection between a first crank arm and the torque member according to the present invention.

First and second crank arms 22', 24' have first and second rearward ends 60, 62 connected to first and second ends of the central portion 18' of the torque member 16' by rigid attachment elements 66. Referring to FIGS. 4 and 5, one type of rigid attachment element 66 is illustrated. The rigid attachment element 66 includes a pair of threaded fasteners 68 passing through the rearward end 62 and a bracket 70 on the torque member 16' to constrain rotations of the first and second arms 22', 24' relative to the torque member 16'.

Figure 6:
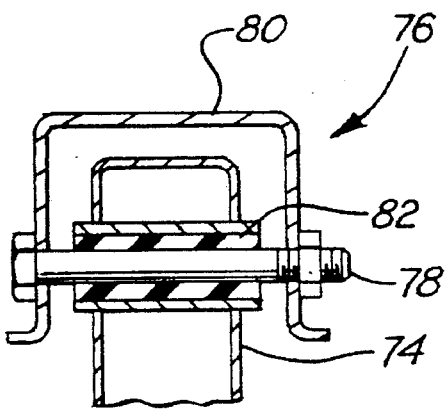
FIG. 6 is a sectional view taken along line 6—6 in FIG. 7 of the pivotal connection between a third crank arm and the torque member according to the present invention.
Figure 7:
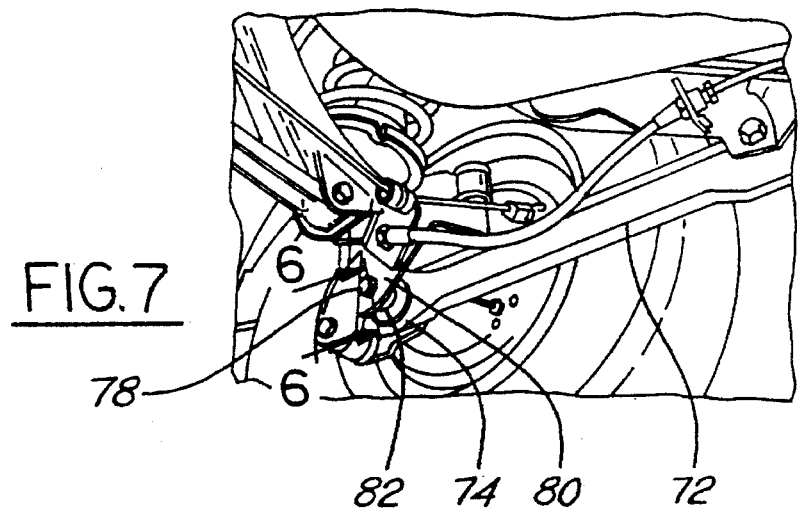
FIG. 7 is a perspective view of the pivotal connection between a third crank arm and the torque member according to the present invention.

This embodiment includes a third crank arm 72 having a third rearward end 74 connected to the second end of the central portion 18' of the torque member 16' by a pivotal attachment element 76. Referring to FIGS. 6 and 7, one type of pivotable attachment element 76 is illustrated. The pivotable attachment element 76 includes a threaded fastener 78 passing through a bracket 80 on the torque member 16' and a sleeved elastomeric bushing 82 disposed in the rearward end 74 of the third crank arm 72.

Referring back to FIG. 3, the first forward end 26' of the first crank arm 22' and a third forward end 84 of the third crank arm 72 are pivotally connected to the chassis in a well-known manner. The second forward end 28' of the second crank arm 24' is pivotally connected to the chassis by the tilt damper 30 and the tilt spring 32 as described above.

In operation, lateral acceleration of the center of gravity of the chassis 12 relative to the suspension system 14 causes the second forward end 28' of the second crank arm 24' to exert a reaction on the tilt damper 30 and tilt spring 32 proportional to the lateral acceleration. This tilt damper 30 and tilt spring 32 create a reaction force to resist tilting of the chassis 12 relative to the suspension 14.

The foregoing description presents two embodiments of the present invention. Details of construction have been shown and described for purposes of illustration rather than limitation. Modifications and alterations of the invention will no doubt occur to those skilled in the art that will come within the scope and spirit of the following claims.

We claim:

1. A tilt control apparatus for use in a motor vehicle having a chassis and a suspension system, said tilt control apparatus comprising:

a torque transfer member transversely oriented relative to a longitudinal axis of the motor vehicle having first and second ends;

a first crank arm rigidly connected to said first end of said torque transfer member;

a second crank arm rigidly connected to said second end of said torque transfer member;

a link member having a lower link end being pivotally connected to said first crank arm opposite said torque member and an upper link end interconnecting the torque transfer member between the chassis and the suspension system;

a tilt damper having a lower damper end being pivotally connected to said second crank arm opposite said torque member and an upper damper end interconnecting the torque transfer member between the chassis and the suspension system; and a tilt spring interconnecting the torque transfer member between the chassis and the suspension system such that said torque transfer member transfers a torsional reaction proportionate to a chassis tilt angle and rate, said tilt spring having an effective stiffness substantially less than that of the torque transfer member.

2. A tilt control apparatus according to claim 1, further comprising:

a transversely extending axle member;

a bushing block secured to said axle member and having an aperture for receiving said torque member therethrough, said bushing block being operative to rotatably support said torque member on said axle member;

said upper link end pivotally connects to said chassis;

said upper damper end pivotally connects to said chassis; and an upper spring end pivotally connects to said chassis.

3. A tilt control apparatus according to claim 1, wherein said tilt spring is coaxially disposed about said tilt damper, a lower end of said tilt spring being securely connected to said lower end of said tilt damper and an upper end of said tilt spring being securely connected to said upper end of said tilt damper such that said tilt spring and said tilt damper compress and extend together.

4. A tilt control apparatus according to claim 1, wherein said tilt damper is characterized in that it provides equal damping forces in both compression and extension.

5. A tilt control apparatus according to claim 1, wherein said tilt spring is unloaded when the chassis is not tilted relative to the suspension system.

6. A tilt control apparatus according to claim 1, wherein said effective stiffness of said torque member is at least ten times that of said tilt spring.

7. A tilt control apparatus for use in a motor vehicle having a chassis and a suspension system, said tilt control apparatus comprising:

a transversely extending axle member;

a torque member transversely oriented relative to a longitudinal axis of the motor vehicle having first and second ends;

a bushing block secured to said axle member and having an aperture for receiving said torque member therethrough, said bushing block being operative to rotatably support said torque member on said axle member;

a first crank arm rigidly connected to said first end of said torque member;

a second crank arm rigidly connected to said second end of said torque member;

a link member having a lower link end being pivotally connected to said first crank arm opposite said torque member and an upper link end pivotally connects to said chassis;

a tilt damper having a lower damper end being pivotally connected to said second crank arm opposite said torque member and an upper damper end pivotally connects to said chassis; and a tilt spring interconnecting the torque member between the chassis and the suspension system such that said torque member transfers a torsional reaction proportionate to a chassis tilt angle and rate, said tilt spring having an effective stiffness substantially less than that of the torque member.

8. A tilt control apparatus according to claim 7, wherein said tilt spring is coaxially disposed about said tilt damper, a lower end of said tilt spring being securely connected to said lower end of said tilt damper and an upper end of said tilt spring being securely connected to said upper end of said tilt damper such that said tilt spring and said tilt damper compress and extend together.

9. A tilt control apparatus according to claim 7, wherein said tilt damper is characterized in that it provides equal damping forces in both compression and extension.

10. A tilt control apparatus according to claim 7, wherein said tilt spring is unloaded when the chassis is not tilted relative to the suspension system.

11. A tilt control apparatus according to claim 7, wherein said effective stiffness of said torque member is at least ten times that of said tilt spring.

12. A tilt control apparatus for use in a motor vehicle having a chassis and a suspension system, said tilt control apparatus comprising:

a torque member transversely oriented relative to a longitudinal axis of the motor vehicle having first and second ends;

a first crank arm having a first rearward end rigidly connected to said first end of said torque member and a first forward end pivotally connected to the chassis;

a second crank arm having a second rearward end rigidly connected to said torque member adjacent to said second end and a second forward end;

a third crank arm having a third rearward end pivotally connected to said second end of said torque member and a third forward end pivotally connected to said chassis;

a tilt damper having a lower damper end pivotally connected to said second forward end of said second crank arm and an upper damper end pivotally connected to said chassis; and a tilt spring interconnecting the torque member between the chassis and the suspension system such that said torque member transfers a torsional reaction proportionate to a chassis tilt angle and rate, said tilt spring having an effective stiffness substantially less than that of the torque member.

13. A tilt control apparatus according to claim 12, wherein said tilt spring is coaxially disposed about said tilt damper, a lower end of said tilt spring being securely connected to said lower end of said tilt damper and an upper end of said tilt spring being securely connected to said upper end of said tilt damper such that said tilt spring and said tilt damper compress and extend together.

14. A tilt control apparatus according to claim 12, wherein said tilt damper is characterized in that it provides equal damping forces in both compression and extension.

15. A tilt control apparatus according to claim 12, wherein said tilt spring is unloaded when the chassis is not tilted relative to the suspension system.

16. A tilt control apparatus according to claim 12, wherein said effective stiffness of said torque member is at least ten times that of said tilt spring.

* * * * *